(12) United States Patent
Birkl et al.

(10) Patent No.: US 10,291,037 B2
(45) Date of Patent: May 14, 2019

(54) ELECTRICAL ENERGY STORAGE DEVICE INCLUDING INDIVIDUALLY CONTROLLED ENERGY CELL SLOTS

(71) Applicant: Oxford University Innovation Limited, Oxford (GB)

(72) Inventors: Christoph Birkl, Oxford (GB); Damien Frost, Oxford (GB); Robert Richardson, Oxford (GB); Adrien Bizeray, Oxford (GB); David Howey, Oxford (GB)

(73) Assignee: OXFORD UNIVERSITY INNOVATION LIMITED, Botley, Oxford (GB)

( * ) Notice: Subject to any disclaimer, the term of this patent is extended or adjusted under 35 U.S.C. 154(b) by 130 days.

(21) Appl. No.: 15/517,703

(22) PCT Filed: Oct. 9, 2015

(86) PCT No.: PCT/GB2015/052967
§ 371 (c)(1),
(2) Date: Apr. 7, 2017

(87) PCT Pub. No.: WO2016/055806
PCT Pub. Date: Apr. 14, 2016

(65) Prior Publication Data
US 2017/0310120 A1    Oct. 26, 2017

(30) Foreign Application Priority Data
Oct. 9, 2014    (GB) .................................. 1417902.2

(51) Int. Cl.
*H01M 10/44* (2006.01)
*H01M 10/46* (2006.01)
(Continued)

(52) U.S. Cl.
CPC ........... *H02J 7/0003* (2013.01); *B60W 10/26* (2013.01); *H02J 7/0008* (2013.01); *H02J 7/0021* (2013.01);
(Continued)

(58) Field of Classification Search
USPC ......... 320/107, 116, 117, 118, 119, 166, 167
See application file for complete search history.

(56) References Cited

U.S. PATENT DOCUMENTS 8,729,860 B2 * 5/2014 Dellantoni ............ H02J 7/0018
320/118
2011/0273140 A1    11/2011 Dellantoni et al.
2014/0125284 A1    5/2014 Qahouq

FOREIGN PATENT DOCUMENTS

EP    2747237 A2    6/2014
EP    2779348 A2    9/2014

OTHER PUBLICATIONS

International Preliminary Report on Patentability and Written Opinion dated Apr. 20, 2017 in corresponding International Application No. PCT/GB2015/052967, 8 pages.
(Continued)

*Primary Examiner* — Edward Tso
(74) *Attorney, Agent, or Firm* — Carter, DeLuca & Farrell LLP

(57) ABSTRACT

An electrical energy storage device includes a plurality of energy cell slots for receiving energy cells; and a controller; wherein the controller is arranged to estimate a characteristic of a cell in each slot; and wherein the controller is arranged to apply charge and discharge currents to each cell slot dependent upon at least one estimated characteristic currently associated with that slot. The controller may be a single controller that controls all slots or it may be implemented as multiple controllers each controlling more than one cell slot or a controller for each slot. The characteristic
(Continued)

may be one or more of: a power capability, a storage capacity, a cell impedance, an energy cell type and an energy cell chemistry.

31 Claims, 4 Drawing Sheets

(51) Int. Cl.
    *H02J 7/00*     (2006.01)
    *B60W 10/26*     (2006.01)
    *H02J 7/34*     (2006.01)

(52) U.S. Cl.
    CPC ............. *H02J 7/0078* (2013.01); *H02J 7/345* (2013.01); *Y02T 10/7055* (2013.01)

(56) References Cited

OTHER PUBLICATIONS

International Search Report for corresponding International Application No. PCT/GB2015/052967 dated Dec. 15, 2015.
Search Report for corresponding GB Application No. 1417902.2 dated Mar. 20, 2015.

\* cited by examiner

ELECTRICAL ENERGY STORAGE DEVICE INCLUDING INDIVIDUALLY CONTROLLED ENERGY CELL SLOTS

CROSS-REFERENCE TO RELATED APPLICATIONS

This application is a U.S. National Stage entry under 35 U.S.C. § 371 based on International Application No. PCT/GB2015/052967, filed on Oct. 9, 2015, which has published under PCT Article 21(2) and which claims priority to British Patent Application No. 1417902.2 filed on Oct. 9, 2014.

TECHNICAL FIELD

The invention relates to the connection of multiple electrical energy storage devices, especially for use with (but not limited to) battery cells of varying types and capacities, and supercapacitors of different types and capacities. Certain preferred forms of the invention are particularly suited for, but not limited to, use in areas with no grid power such as remote areas in the developing world. Other applications include grid power and automotive applications.

BACKGROUND

Energy storage technologies, particularly batteries, are key to providing independent electricity access where the grid is unavailable or unreliable, as well as enabling renewable energy on the electricity grid, and powering electric and hybrid vehicles. In grid and off-grid applications, such technologies are typically combined with solar photovoltaic (PV) systems. Currently, lead acid batteries are the most common technology for off-grid energy storage applications due to their low cost. However, lead acid batteries have low energy density (on the order of 40 Wh/kg), a short lifetime (100-800 cycles) and high environmental impact if hazardous lead is released as a consequence of inadequate handling or disposal. By comparison, for example, lithium ion (Li-ion) batteries have a high energy density (approx. 130 Wh/kg) and a long cycle life (>2000 cycles).

Rechargeable electrical energy storage devices such as batteries and supercapacitors come in a large variety of forms and types (e.g. chemistries). For example, amongst batteries, lithium ion (abbreviated Li-ion) technology is amongst the highest performing and is currently the most prevalent in commercial rechargeable batteries. However, even within this sub-category there are still multiple chemistries such as lithium cobalt oxide ($LiCoO_2$), lithium iron phosphate (LFP), lithium manganese oxide (LMO), lithium nickel manganese cobalt oxide (NMC), lithium nickel cobalt aluminum oxide (NCA) and lithium titanate (LTO). Other popular rechargeable cell chemistries include lead acid, Nickel-Cadmium (Ni-Cad) and Nickel metal hydride (NiMH).

As technologies have developed (and continue to develop), the cell chemistries have changed and capacities and power capabilities have increased (and will continue to increase). Each cell chemistry and capacity has its own characteristic voltage vs. state of charge (SOC) curve that the cell exhibits between fully charged and fully discharged states.

Supercapacitors, also known as electric double-layer capacitors or ultracapacitors, also function as reversible electrical energy storage units or cells. Unlike rechargeable batteries, supercapacitors feature low energy densities but have high power capabilities and are therefore typically used to meet short-term high power demands. The combination or hybridization of rechargeable batteries and supercapacitors is desirable for applications that require both fast charging and discharging as well as high energy storage capabilities, with maximum battery lifetime. Such applications include, for example, electric and hybrid electric vehicles and stationary energy storage devices required to charge and discharge at high rates. Although desirable, the combination of rechargeable batteries and supercapacitors is difficult due to their different characteristic voltage ranges, power capabilities, and energy storage capacities.

Both supercapacitors and rechargeable batteries may be referred to as cells. In the discussion that follows, specific examples may be given that refer to batteries and/or supercapacitors, but the principles discussed may be applied to any electrical energy storage cell, including but not limited to batteries or supercapacitors.

Individual cells are frequently combined together to form packs, either to increase the voltage output of the pack by combining cells in series or to increase current by combining cells in parallel. Commercial battery or supercapacitor packs always combine cells of the same chemistry and nominal capacity so that each cell exhibits substantially the same voltage-SOC curve. Keeping the individual cells as close as possible in characteristics such as impedance and capacity improves the performance of the pack during charge and discharge, and particularly over many such charge/discharge cycles. Large differences in cell capacity are problematic for series connections, since the same current passes through all cells and the total battery capacity is limited by the cell with the lowest capacity. For parallel connections of cells, differences in cell voltages are problematic, since all cells are tied to the same voltage and the total pack voltage is constrained by the cell with the lowest voltage limit. Cell voltages can vary significantly for different cell chemistries and types.

Over the lifetime of a cell (over many charge and discharge cycles), the capacity of the cell is gradually reduced. This reduction in capacity happens at different rates for individual cells in a battery pack, and thus the individual cells in a battery pack become mismatched.

The performance of a battery pack as a whole is limited by the performance of its weakest cell. There are safety issues with over-charging and over-discharging any individual cell which means that once a single battery cell has been exhausted, the whole pack is deemed unusable, even though some cells may still have some useable capacity. Similarly, when a single cell has reached full charge, the supply of charge current must be stopped to the whole pack to avoid over-charging, even though some cells may not yet be fully charged. Similar concerns apply to supercapacitor packs. To ensure safety, management electronics must be provided to prevent over-charge and over-discharge conditions. Such battery management systems (or supercapacitor management systems, or more generally energy cell management systems, all of which will be covered here by the abbreviation BMS normally applied to Battery Management Systems) typically involve voltage and/or current monitoring and temperature sensors to detect overheating, over- or under-voltage and over-current, and to prevent charging in adverse conditions such as low temperatures (for example Li-ion cells may exhibit lithium plating if charged at low temperatures, which could result in internal short-circuiting).

In relation to rechargeable batteries, the above problem has been addressed by various cell balancing techniques that for example either detect when a cell has depleted and redirect charge from other cells that still have capacity to the depleted cell (balancing during discharge), or detect when a cell has reached full charge and then redirect charge from it either to an arbitrary waste load or in more complex systems to other cells that are not yet fully charged (balancing during charge). With these techniques, better use can be made of the capacities of all cells within a pack. However, these balancing techniques can be expensive, slow, and energy inefficient. Furthermore, they are designed to balance cells of similar type and capacity, and are thus unsuitable for cells of different types and capacities.

Battery packs for portable equipment such as laptop computers exist in large numbers and due to the short product lifetime the battery packs become redundant and are discarded regularly. Hundreds of tonnes of Li-ion batteries are disposed of every year. It has been found that the capacity of cells recovered from the same device may vary significantly. Many of the cells from such discarded battery packs still have a useful capacity even though the battery pack as a whole is at its end of life due to the performance of weaker cells. For example, one study found that around 50% of discarded cells had >70% of their nominal capacities. However trying to match these individual cells by chemistry and capacity to form new usable battery packs is not a cost effective process.

The cost of new battery packs makes them unsuitable for use in the developing world. The high cost of new battery packs is due to the cost of the cells as well as the cost of the charging/discharging electronics.

BRIEF SUMMARY

According to one aspect, the invention provides an electrical energy storage device comprising: a plurality of energy cell slots for receiving energy cells; and a controller; wherein the controller is arranged to estimate a characteristic of a cell in each slot; and wherein the controller is arranged to apply charge and discharge currents to each cell slot dependent upon at least one estimated characteristic currently associated with that slot.

It will be appreciated that the controller may be a single controller that controls all slots, or it may be implemented as multiple controllers which each control more than one cell slot or there may be a controller for each slot.

The term "slot" is used here to mean a connection mechanism to a cell. In some embodiments, this may be a physical slot arranged to receive a cell with a particular size and/or geometry (for example, many rechargeable cells of the 18650 geometry are available, so slots could be provided specifically for those). However, more generally the term "slot" is intended to cover any connection mechanism for connecting to different cells with different constructions, different sizes and different geometries. For example, this may take the form of a simple connector to which any cell could be connected. Essentially, this connector simply needs a positive terminal connection and a negative terminal connection. This provides the greatest flexibility and versatility, allowing both rechargeable cells of any size and geometry to be connected as well as allowing supercapacitors of any size and geometry to be connected. Cells of any type may be connected to any connector (any slot) and the system can estimate what is connected and how best to use it as described below.

By estimating characteristics of the energy cells that are connected to the energy storage device, the system is able to adjust the charging and discharging currents applied to each cell so as to make the best use of the attached cells. Energy storage cells can vary a great deal. For example at one end of the spectrum there are rechargeable battery cells that have a high energy storage capacity, but lower power capabilities. At the opposite end of the spectrum there are supercapacitors that have a lower energy storage capacity, but much higher power capabilities. The invention applies to rechargeable battery cells, supercapacitors and any intermediate (or hybrid) cells in between. Combinations of different types of energy cell (e.g. combinations of battery cells with supercapacitors) are also possible. To make optimal use of the attached cells of different types, different charge and discharge currents need to be applied. For example, supercapacitors can take much higher charge and discharge currents than rechargeable batteries. If battery cells and supercapacitor cells are combined in the device, it may be desirable (in order to limit battery degradation) initially to direct more current into the supercapacitors to charge them to full capacity before charging the rechargeable battery cells at a slower rate for longer. During discharge, the higher power capability of the supercapacitor cells allows them to handle spikes in power consumption and therefore the controller may only draw on them when the power requirements exceed the capabilities of the available rechargeable battery cells.

The at least one characteristic may comprise one or more of: a power capability, a storage capacity, a cell impedance, an energy cell type and an energy cell chemistry.

Power capability is a particularly important characteristic where supercapacitors are involved. When a plurality of arbitrarily selected supercapacitors of different size and construction are combined, they will likely have different power capabilities. For optimal use, these supercapacitors should be balanced by drawing power from them according to their capabilities. Providing this balancing capability means that combinations of supercapacitors can be made without having to select and combine supercapacitors with similar qualities, e.g. of the same capacity and power capability. The system thus provides much greater versatility and allows better use to be made of available components.

Estimating a cell type (e.g. identifying whether it is a battery cell or a supercapacitor cell) is advantageous for determining the overall contribution that a cell might make to the system (e.g. whether it is better operated as a high capacity storage device or a high power capability device). The controller may operate different charge/discharge schemes for different cell types. Estimating (or identifying) cell chemistries is also important for determining other parameters that may apply to the cell. For example, estimating the cell chemistry of rechargeable cells can determine the optimal cut-off voltages that are applied during charge cycles and discharge cycles to avoid over-charging and over-discharging. Without such cell chemistry estimation, a lowest common range would need to be employed which would result in under-use of many cells and thus sub-optimal performance.

Estimating the storage capacity of cells is beneficial for synchronizing cells so that during charge and discharge the higher capacity cells are loaded more than those of lower capacity. This provides improved performance and prolongs the cell life as will be discussed further below.

Viewed from one aspect, the invention provides an electrical energy storage device comprising: a plurality of rechargeable cell slots for receiving rechargeable cells; and a controller; wherein the controller is arranged to estimate the capacity of a cell in each slot; and wherein the controller is arranged to apply charge and discharge currents to each cell slot at a rate dependent on the estimated cell capacity currently associated with that slot. In some embodiments, the current may be proportional to the capacity.

By estimating the capacity associated with each slot (i.e. the capacity of the cell currently mounted in that slot), the system can attempt to synchronise the charging and discharging of each cell by adjusting the current supplied to or drawn from each cell. By loading each cell according to its capacity, the weaker (smaller capacity) cells are loaded less and the stronger (larger capacity) cells are loaded more. Thus each cell is loaded according to its capabilities. This system essentially balances the cells throughout usage (through charging and discharging) so that all cells should reach full charge at the same time and all cells should be fully discharged at the same time. Thus there is no need to redirect energy between the cells either at the end of a charge cycle or at the end of a discharge cycle and the capacity of each cell is fully utilized.

As another example in the case of a plurality of supercapacitors, the current provided to the cells or drawn from the cells may be balanced in order to maintain the same voltage across all cells. Therefore larger currents will be applied to a bigger supercapacitor than to a smaller supercapacitor.

Alternatively, cells can be loaded according to their power capability in order to draw power optimally from the available cells, for example in the case of a mixture of batteries and supercapacitors, current provided to the cells or drawn from the cells may be higher for those cells (e.g. the supercapacitors) which are capable of a larger number of high current cycles. This type of arrangement may be particularly useful for example in regenerative braking systems (e.g. for automotive applications) where very high power can be available in a short period of time that would be better directed onto the supercapacitors rather than onto the battery cells. Similarly, this energy could be drawn off the supercapacitors at high power for a subsequent strong acceleration.

A combination of capacity and power capability may of course be used in some embodiments.

As the cells are loaded according to their capabilities, the lifetime of each cell is also prolonged compared with a traditional arrangement in which the weaker (e.g. less durable or smaller capacity) cells are consistently loaded at the same level as stronger cells (e.g. more durable or larger capacity). The traditional arrangement thus overloads the weaker cells, degrading them faster and reducing their lifetimes, and increasing the mismatch between cells. This is particularly beneficial for making optimal use of rechargeable battery cells.

Because the charging and discharging of each cell can be independently controlled, any cell can be interchanged at any point with a different cell of different capacity (and different other characteristics such as power capability). For example in the case of rechargeable battery cells, if one cell reaches the end of its useful life before the others that are currently installed in the system, that single cell can be replaced while the other cells are still used to their full available capacities. An estimate of the new cell's capacity is all that is required so as to establish the optimal charge and discharge rates.

As each slot can be controlled individually, a further advantage of this arrangement is that cells of different chemistries or types can be used alongside one another. The system can simply adjust the charge/discharge currents for each cell, regardless of its chemistry so as to synchronize all cells. Preferably the system can also adjust the charge voltage independently for each slot. Many cells of different chemistries have a similar voltage range from their lowest to highest cut-off voltages, but some cells have different ranges. Applying the same charge voltage to cells with different ranges would result in underuse of the cells with a higher range. For example, lithium-ion iron phosphate (LFP) cells typically have a low cut-off voltage of about 2.0 V and a high cut-off voltage of about 3.6 V. Other Lithium ion cell chemistries have voltage ranges closer to 3.0 V to 4.2 V.

Another advantage of the individually controlled slots is that different electrical energy storage technologies can be combined to form a single pack. For example, Li-ion cells can be combined with super capacitors and/or Nickel Metal hydride cells.

The electrical energy storage device preferably further comprises a bi-directional DC to DC converter for each cell slot, said DC to DC converters being controlled by the controller. In various alternative implementations, each DC to DC converter may be controlled by its own controller or by a controller that controls a small group of cells or by a central controller. These converters decouple the voltages and currents of the individual cells and allow the ability to connect an arbitrary number of cells in a single device, thus scaling the total battery capacity as required. As discussed further below, the system preferably also estimates the residual battery capacity and/or power capability of each connected cell. The estimated capacity can then be used to scale the amount of power each converter will provide. In this way, converters connected to large capacity cells or high power cells such as supercapacitors can provide a greater share of the load current. As an additional benefit, this cell management technique minimizes the degradation of already worn cells by reducing the currents drawn from these cells.

The controller is preferably arranged to estimate the at least one characteristic (e.g. capacity and/or power capability, etc.) associated with each slot periodically. By making regular or periodic estimates, the system will maintain optimal operation, e.g. synchrony between the cells despite the gradually degrading capacity of each cell over time. As cells degrade over time at different and unpredictable rates, regular measurements keep the system at optimal efficiency. Additionally, regular or periodic measurements ensure that if a single cell is changed for a different cell, a capacity of the new cell will be estimated soon after the change.

Any technique for capacity estimation of each cell may be used. For example some techniques may use the cell output voltage or more detailed measurements of the cell's voltage curve to estimate a current capacity.

In some preferred embodiments, the controller may be arranged to estimate the at least one characteristic (e.g. capacity, etc.) associated with each slot after every charge phase. Additionally or alternatively, the controller may be arranged to estimate the at least one characteristic (e.g. capacity) associated with each slot after every discharge phase. Although characteristics such as capacity may be estimated from partial charge and/or discharge phases, preferably full charge and discharge phases are used as these provide for easier and more accurate estimates. Full charge and/or discharge cycles essentially represent changes between the minimum charge and maximum charge of the cell and thus represent the present capacity of the cell.

The energy storage device may be partially charged and/or partially discharged during use, e.g. it may be partially discharged when its full capacity is not required and then subsequently partially charged up to full capacity again. However, capacity estimates are more difficult when the cells are not charged or discharged over their full capacity range. Therefore it is preferred that the energy storage device is periodically fully discharged and/or fully charged, i.e. charged/discharged between its minimum and maximum capacity limits (note that these refer to the minimum and maximum recommended safe limits of use, beyond which the cell would be considered over-charged or over-discharged). The storage device may achieve this by outputting a signal to the user to perform a full discharge/charge cycle or it may automatically ensure such a cycle by draining all cells, or a certain number of cells, through an internal load or by any other suitable mechanism. The system may perform such procedures on a limited number of cells (a sub-set of the total cells) so as to allow a capacity check on that limited number of cells while the remaining cells continue to work as normal. The controller may also or alternatively perform a full charge/discharge cycle immediately upon startup and/or after a reset operation, e.g. upon detection of one or more individual cells being replaced.

In preferred embodiments the capacity estimate is based on a coulomb counting method, i.e. summing or integrating the charge/discharge current over time. For example, starting from a fully charged cell (e.g. one that has been fully charged via a normal constant current constant voltage charging scheme) the current that is drawn from that cell in relatively small discrete time intervals can be summed until the cell is fully discharged, thus providing a measurement of the amount of charge that has been drawn from the cell. Similarly, the charging current can be summed or integrated over the charging time from a fully discharged state to a fully charged state to provide an estimate of capacity. As the controller is already arranged to control the charge and discharge currents for the cell, this provides a particularly convenient capacity measurement technique. Voltage translation is another possible technique that could be used for capacity estimation. Alternatively, a combination of coulomb counting and voltage translation could be used.

Preferably the controller implements a function which depends on the at least one characteristic estimate associated with each slot to determine the amount of charge/discharge current to sink/source to said slot. The particular function will depend in part on the purpose of the system, but also on the type of cells attached. In some embodiments, the controller may store a charge/discharge current factor associated with each slot.

A single value for each cell may be enough to determine how best to treat each cell. Such implementations can adjust rapidly to changes of cells without having to detect that a cell has been swapped. However, in other embodiments the controller preferably stores a history of characteristic estimates for each slot and said function may depend on said history. The history of a cell can provide more information about its current state of health and can influence how best to use the cell. This history information may also be used to determine when a cell is at the end of its useful life. An indicator (such as an LED) may be used to indicate that the cell should be swapped out.

The controller may update the charge/discharge current function (e.g. current factor) every time the at least one characteristic is estimated.

The at least one characteristic may comprise capacity and the function may scale the charge/discharge current linearly with the estimated capacity.

In some embodiments in which the controller stores a charge/discharge current factor associated with each slot, this charge/discharge current factor may indicate the charge/discharge current that was last applied to that slot or the charge/discharge current that should next be applied to that slot. The factor may be a value for the current or it may be a factor that indicates the proportion of total current to apply to the slot. For example, the fractional capacity (of one cell) with respect to the total storage device capacity (of all cells) may be used as the factor to indicate how current should be distributed between the various cells. Upon initial start up or after a reset operation, the factor may be set to a standard preset value that is used for charging and discharging until a more accurate estimate of the cell's capacity has been made. The controller may update the charge/discharge current factor every time the capacity is estimated. In this way, the system iterates towards a state in which all cells in the storage device are being operated in synchrony (i.e. they will reach fully charged and/or fully discharged states more or less at the same time). Starting from arbitrary and unknown cell capacities, a single iteration will result in a capacity estimate for each cell and will result in the cells being operated almost in synchrony in the next cycle. However, as the capacity estimate is affected very slightly by the current charge/discharge rate, small differences may still remain between the charge and discharge times of the cells during a second, subsequent cycle. However, after a second cycle and second capacity measurement made at very close to the system's optimal current for each cell, all cells within the device can be expected to be substantially in sync. Continual ongoing estimates of capacity for each cell will result in minor adjustments to each slot's current factor and will thus maintain the optimal operation.

In the electrical energy storage device, a plurality of said slots preferably each have an energy cell connected thereto. The energy cells may comprise rechargeable battery cells. The energy cells may comprise supercapacitors. The plurality of cells may comprise a plurality of different capacities. These may be either different nominal capacities, different states of health (i.e. currently available capacities after some cell degradation) or both. The plurality of cells may comprise a plurality of different cell chemistries and types. The plurality of cells may comprise a plurality of different power capabilities.

The controller may be arranged to identify, based on said at least one estimated characteristic that a cell is no longer suitable for use in the system. Upon such identification, a signal or alert may be provided to the user (e.g. an LED light or an audible alarm or buzzer) to indicate that the identified cell should be replaced.

A modular system may be provided with each module comprising a plurality of slots (and cells) controlled as described above.

According to another aspect, the invention provides a method of storing and using electrical energy in a plurality of energy cells comprising: estimating at least one characteristic of each of said plurality of cells; charging said plurality of cells in a charging step that comprises: simultaneously charging said plurality of cells by providing a charge current to each cell that is dependent upon at least one estimated characteristic of said cell; and discharging said plurality of cells in a discharging step that comprises: simultaneously discharging said plurality of cells by drawing a discharge current from each cell that is dependent upon at least one estimated characteristic of said cell.

All of the preferred features described above in relation to the energy storage device also apply equally to this method of storing energy.

Thus the at least one characteristic may comprise one or more of: a power capability, a storage capacity, a cell impedance, an energy cell type and an energy cell chemistry. The at least one characteristic may comprise a storage capacity and the storage capacity estimate may be based on a coulomb counting method. The charge current and the discharge current may be provided through a bi-directional DC to DC converter for each cell slot, said DC to DC converters being controlled by a controller. The characteristic associated with each slot may be estimated periodically. The characteristic associated with each slot may be estimated after every charge phase. The characteristic associated with each slot may be estimated after every discharge phase. The method may comprise performing a full charge/discharge cycle upon startup.

The method may comprise implementing a function which depends on the at least one characteristic estimate associated with each slot to determine the amount of charge/discharge current to sink/source to said slot. The method may comprise storing a history of characteristic estimates for each slot and said function may depend on said history. The method may comprise updating the function every time the at least one characteristic is estimated. The at least one characteristic may comprise capacity and the function may scale the charge/discharge current linearly with the estimated capacity.

According to yet another aspect, the invention provides a method of storing and using electrical energy in a plurality of rechargeable cells comprising: estimating the capacity of each of said plurality of cells; charging said plurality of cells in a charging step that comprises: simultaneously charging said plurality of cells by providing a charge current to each cell that is proportional to said cell's capacity; and discharging said plurality of cells in a discharging step that comprises: simultaneously discharging said plurality of cells by drawing a discharge current from each cell that is proportional to said cell's capacity.

Viewed from yet another aspect, the invention provides an electrical energy storage device comprising: a plurality of slots for receiving electrical energy storage devices, further comprising: a controller; wherein the controller is arranged to determine the type of electrical energy storage device in each slot.

Although the majority of the description provided here is in the context of re-using second life cells (i.e. cells that have been used and discarded and/or recycled), it will be appreciated that the invention can also be applied to new cells to enhance the battery life by decreasing the load on the cells which deteriorate more quickly than others. This can be extremely useful in cases where battery life is important, e.g. remote automated systems where access for cell replacement is difficult or costly. Other systems such as some modern laptops are designed in such a way that battery replacement is not intended within the lifetime of the device. This is mostly done to reduce the size of the device. This invention can also be of particular use in such devices to prolong the useful service life of the battery. In such devices, the service life of the device is often closely linked to the service life of the battery.

BRIEF DESCRIPTION OF THE DRAWINGS

Preferred embodiments of the invention will now be described by way of example only and with reference to the accompanying drawings in which.

DETAILED DESCRIPTION

A system for using reclaimed rechargeable battery cells is shown and described below. The electrical design of the system will be discussed with reference to FIGS. 1-3.

In order to maximize the remaining energy storage capacity in recovered Li-ion cells (or indeed other rechargeable cell chemistries) of varying degrees of degradation, the State of Charge (SOC) of each cell is monitored and controlled individually. This challenge is addressed by interfacing each cell with an individual power module. In the embodiments described here, the power module contains a small switch mode power supply (SMPS) which regulates the power in and out of the cell, a microcontroller which implements the control and BMS algorithms, and an output voltage bus that can be connected in parallel with other power modules to increase the energy storage capabilities of the entire system.

Figure 1:
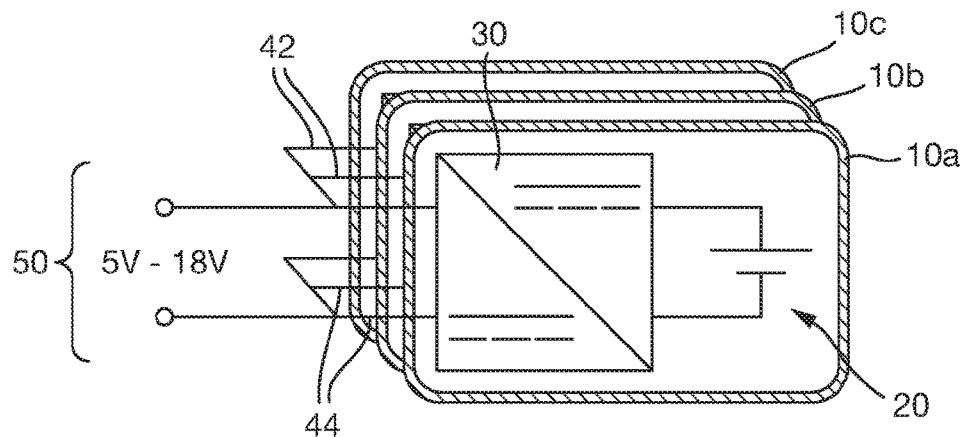
FIG. 1 schematically illustrates a system for using reclaimed rechargeable cells in a scalable energy storage system.

FIG. 1 shows a schematic representation of the system 100. Three power modules 10a, 10b, 10c are shown in parallel (although in principle any number of modules may be used). Power module 10a has a cell 20 (e.g. a reclaimed Li-ion cell) and a power stage 30 that includes a bi-directional DC-DC converter 32. Module connectors 42, 44 from each power module 10a, 10b, 10c are connected in parallel and connected to input/output port 50.

Port 50 provides a connection to the system 100 for connecting the system to devices (i.e. for using and thus discharging the cells 20) and for charging the cells 20, e.g. from a solar PV panel.

All three power modules 10a, 10b, 10c have the same components as those illustrated for module 10a.

Module Design

Figure 2:
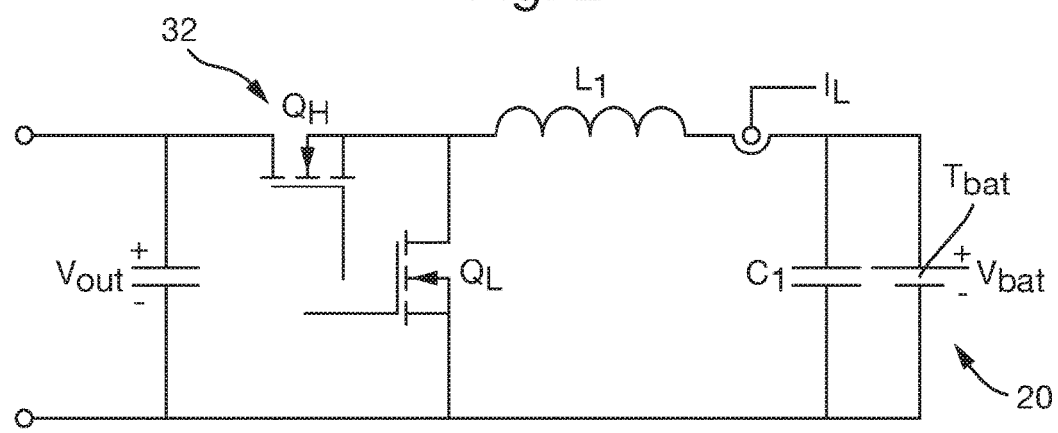
FIG. 2 shows a DC-DC converter circuit for a power module of each cell in the system.

Each power module 10a, 10b, 10c may contain a microcontroller which runs the BMS and controls the power flow in and out of the cell 20. Alternatively a single microcontroller may simultaneously control all power modules 10a, 10b, 10c. In one embodiment a bi-directional half bridge dc-dc converter was used as the DC-DC converter 32. This is illustrated in FIG. 2. The converter 32 measures the input and output voltages, as well as the inductor current and battery temperature. All of these sensor inputs are also used by the BMS. The output voltage can be controlled by adjusting the duty cycles of MOSFETs $Q_H$ and $Q_L$.

FIG. 2 shows a schematic of the power stage 30. The output of each bi-directional half bridge dc-dc converter 32 is a bi-directional power port which can be connected in parallel with other converters 32 and be connected to a charging source (not shown). The charging source can be, but is not limited to, a grid connected power supply or a solar PV panel. In the case where the output is connected to a solar PV panel, the maximum power point (MPP) of the panel will change with temperature and solar irradiance conditions. Therefore, the micro-controller will implement a perturb and observe maximum power point tracking (MPPT) algorithm to track the maximum power of the panel. The power stage 30, will charge the cell 20 when the voltage at the input port 50 is above a predetermined threshold.

Each converter 32 acts independently of the others to share the load between cells in proportion to their capacity.

Control

Figure 3:
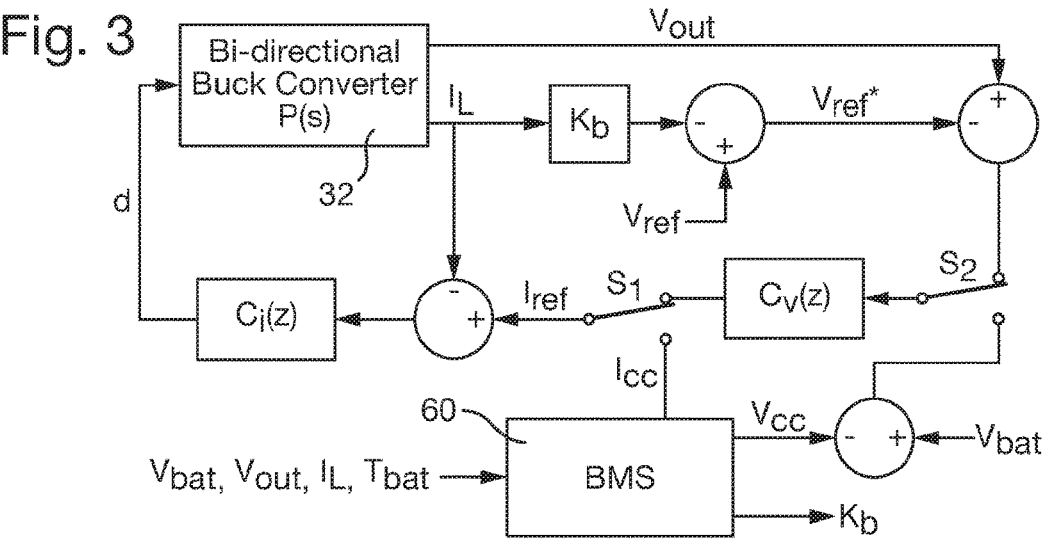
FIG. 3 shows a simplified schematic of the control system associated with each power module.

FIG. 3 shows a diagram of the control logic implemented in the micro-controller. There are three main operating modes of the converter. The discharge mode, Mode 1, provides a nominal 12 V to the output of the DC-DC converter 32. The charging modes, Mode 2 and Mode 3, are activated once the output of the converter 32 is connected to a voltage source between 14 V and 20 V.

Mode 1 is the discharge mode. In Mode 1, the cell 20 is being discharged into a load connected to the output terminals 42, 44 of the power module 10 (more generally connected to the port 50 of system 100). In this mode, the control flow switches S1 and S2 are in the up position as shown in FIG. 3. The inner current control loop with controller $C_i(z)$ and the outer voltage control loop with controller $C_v(z)$ work together to maintain a voltage $V_{ref}^*$ at the output terminals. Current sharing of the load is achieved using voltage droop control. Voltage droop control works by adjusting the voltage reference $V_{ref}$ by subtracting a value proportional to the converter current. This new reference is $V_{ref}^*$, shown in FIG. 3. The proportionality constant which is multiplied by the converter current, $K_b$, is inversely proportional to the capacity of the cell connected to the converter, 30, and is determined by the BMS. Thus, power modules 10a, 10b, 10c which have larger capacity cells 20 will provide more current to the load than modules 10a, 10b, 10c with smaller capacity cells 20.

While the converter 32 is operating, the BMS 60 monitors the cell 20, ensuring that it is operating within its safety limits. The BMS 60 also performs a capacity estimation (to be described further below) to determine the parameter $K_b$.

Mode 2 is a first charging mode for charging with constant current. Mode 2 is activated when the power modules' outputs 42, 44 are connected to a charging source with a voltage between 14 V and 20 V. In this mode, the control flow switch S1 is in the down position of FIG. 3, and the voltage controller, $C_v(z)$, is off. The current reference $I_{ref}$ for the converter 32 is provided by the BMS 60 which is implementing a perturb and observe MPPT algorithm. The current reference $I_{ref}$ will be proportional to the capacity of the cell 20 and will vary according to the MPPT algorithm. If a new cell 20 is attached, the current reference $I_{ref}$ will be set to its minimum value. This minimum value is a preset value stored within the BMS. In the case where the converter 32 is connected to a grid-connected voltage source, the MPPT algorithm will request the maximum charging current for the cell 20 that is being charged.

During Mode 2, the BMS 60 monitors the cell voltage $V_{bat}$ and switches to Mode 3 when the upper voltage limit of the cell is reached. The upper voltage limit of the cells may be determined by detecting the chemistry of the cell, e.g. by examining the cell voltage-SOC curve for the cell (which is different for different chemistries). This is further discussed below.

Mode 3 is a second charging mode for charging with constant voltage. In Mode 3 the control flow switch S1 is in the up position of FIG. 3 and the control flow switch S2 is in the down position of FIG. 3. The BMS 60 provides a voltage reference $V_{cc}$ which is compared to the battery voltage $V_{bat}$. The voltage controller $C_v(z)$ now controls the battery voltage $V_{bat}$ instead of the output voltage $V_{out}$. The BMS 60 will determine when the battery is fully charged by monitoring $I_L$ (the inductor current from the converter 32) and comparing it to a preset cut-off current. It will also determine if there is enough power from a charging source such as a solar PV panel by ensuring that $V_{out}$ remains above 14 V while $I_L$ is still charging the battery.

The algorithms designed for this BMS 60 serve two main purposes:
A) Condition monitoring for safe operation
B) Current control and balancing of individual cells A. Condition Monitoring for Safe Operation Each cell 20 is equipped with a temperature sensor, a voltage sensor and a current sensor. One example of upper and lower safety limits on those parameters is given in Table 1 below. These safety limits are based on a review of manufacturer specifications of Li-ion cells commonly used in electronic devices. Temperature limits are similar for most cell types. The lower temperature limit is more conservative for charging, since very low temperatures can trigger lithium plating and dendrite growth, which can lead to internal short circuits. Voltage limits depend on the cathode chemistry. For example LFP cells generally have a lower range of operating voltage than most other chemistries (3.6 V to 2.0 V).

In some embodiments, the cell type may be identified by an initial voltage measurement of the newly inserted cell and measurement of the voltage gradient during a subsequent charging step. For example LFP cells may be identified by detecting a sharp voltage gradient during charge when approaching their maximum voltage of 3.6 V. In this example, for all other chemistries, the most conservative voltage range of 4.2 V to 3.0 V is applied. The current is limited to 3.0 A, which is well within the operating range of 2500 mAh to 2900 mAh cells. The identified cell chemistry and associated voltage limits are stored in the memory of the controller for the corresponding cell slot.

TABLE 1

| Safety Limits | | |
| --- | --- | --- |
| Parameter | Upper Limit | Lower Limit |
| Temperature | 60° C. | charge: 0° C. discharge: −10° C. |
| Voltage | 3.6 V-4.2 V | 2.0 V-3.0 V |
| Current | 3.0 A | — |

In some embodiments, newly inserted cells that have already reached their end of life may be identified during an initial voltage measurement and subsequent charging step. For example, if the cell voltage of the newly inserted cell is below a minimum preset value (e.g. 1.5 V) and the cell voltage rises rapidly when a charging current is applied and reaches an upper voltage limit of 3.6 V within a few seconds or minutes, the cell may be identified as unsuitable for operation and the user is informed by an indicator, e.g. an LED light. Similar procedures may be used to identify cells that have become unsuitable over time and need to be replaced.

In this particular embodiment, these safety limits are continuously monitored, by sampling at a frequency of 5 kHz. Breaching any safety limits triggers an immediate shut down of the power module, isolating the affected cell 20.

B. Algorithms for Current Control and Cell Balancing

As described above, the bi-directional DC-DC converters 32 allow independent current control on each cell 20. In order to optimally utilize their capacities, the current through each cell 20 is controlled such that all cells 20 discharge simultaneously. This means that a given load current is provided by individual cells 20 according to their capacities, i.e. higher capacity cells are subjected to higher currents than lower capacity cells. The system 100 is designed for used cells. For such cells the cell capacities are not initially known. More generally for used cells, the type (e.g. chemistry) and state of health of any given cell is not known. This problem is addressed with an algorithm that estimates cell capacities, for example (but not limited to) by means of a comparative/iterative Coulomb counting approach. The capacity of a cell 20 at a given discharge current can be calculated according to:

$$Q = \int_{t=0}^{t} I(t) dt$$

where I is current and t is discharge time.

For discrete time intervals k, this can be expressed as:

$$Q = \sum_{k=1}^{N} I_k \Delta t$$

An estimate of cell capacity can thus be calculated from accurate current measurements performed at small time intervals. This cell capacity measurement can be employed to determine the parameter $K_b$, used in the voltage droop controller as shown in FIG. 3.

Figure 4:
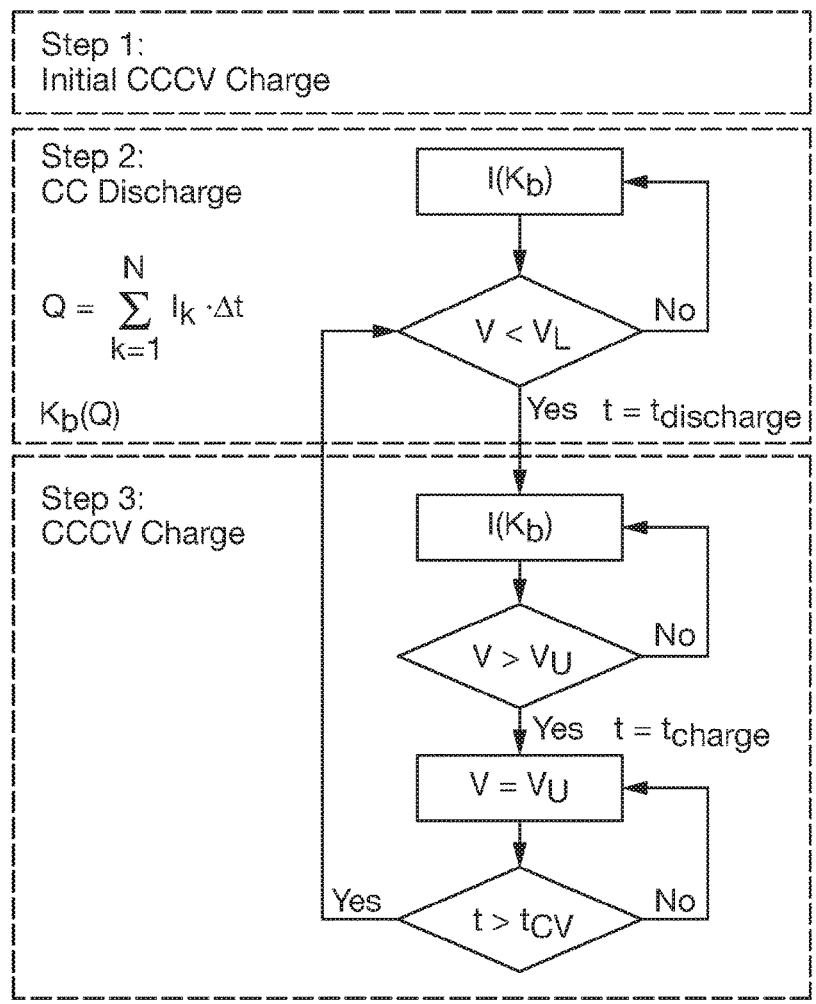
FIG. 4 illustrates a battery management system algorithm for charging and discharging cells within the system.

Capacity measurements and current scaling are implemented for all cells 20 in the system 100 and the computations can be repeated with every charge and discharge cycle, as illustrated in the flowchart shown in FIG. 4.

As shown in FIG. 4, the algorithm is initiated with a first constant current constant voltage (CCCV) charge to balance the cells at a uniform state of charge (SOC) (Step 1 in FIG. 4). This initial charging step may be performed upon system start-up or after a reset operation, or after a new cell has been inserted or replaced. All cells 20 are charged with equal currents to their maximum voltages, which are held until a predefined time limit is exceeded. After that, the cells 20 are discharged with equal currents, until the cut-off voltages are reached (this is the first pass through Step 2 in FIG. 4). Measuring the time of this first discharge cycle allows calculating the cell capacities and provides an initial estimate of $K_b$.

For the CCCV charge cycle of Step 3 of FIG. 4, the $K_b$ value calculated in Step 2 is used to correct the charge current. In Step 3, the charge capacity is calculated by coulomb counting in the same manner as the discharge capacity. $K_b$ is updated at the end of the charge cycle.

Upon start-up of the device, a full charge-discharge-charge cycle is preferably conducted (i.e. Steps 1 to 3 of FIG. 4) in order to adjust cell currents and synchronize charge and discharge times. During subsequent ordinary operation the current correction factors $K_b$ are updated. $K_b$ may be updated for each cell by continuous comparison of the charged/discharged energy with that of the previous charge/discharge cycle. In this manner, $K_b$ continually reflects the changing capacity as the cell degrades over time. A history of $K_b$ values is preferably recorded to provide more information on the cell.

Figure 5:
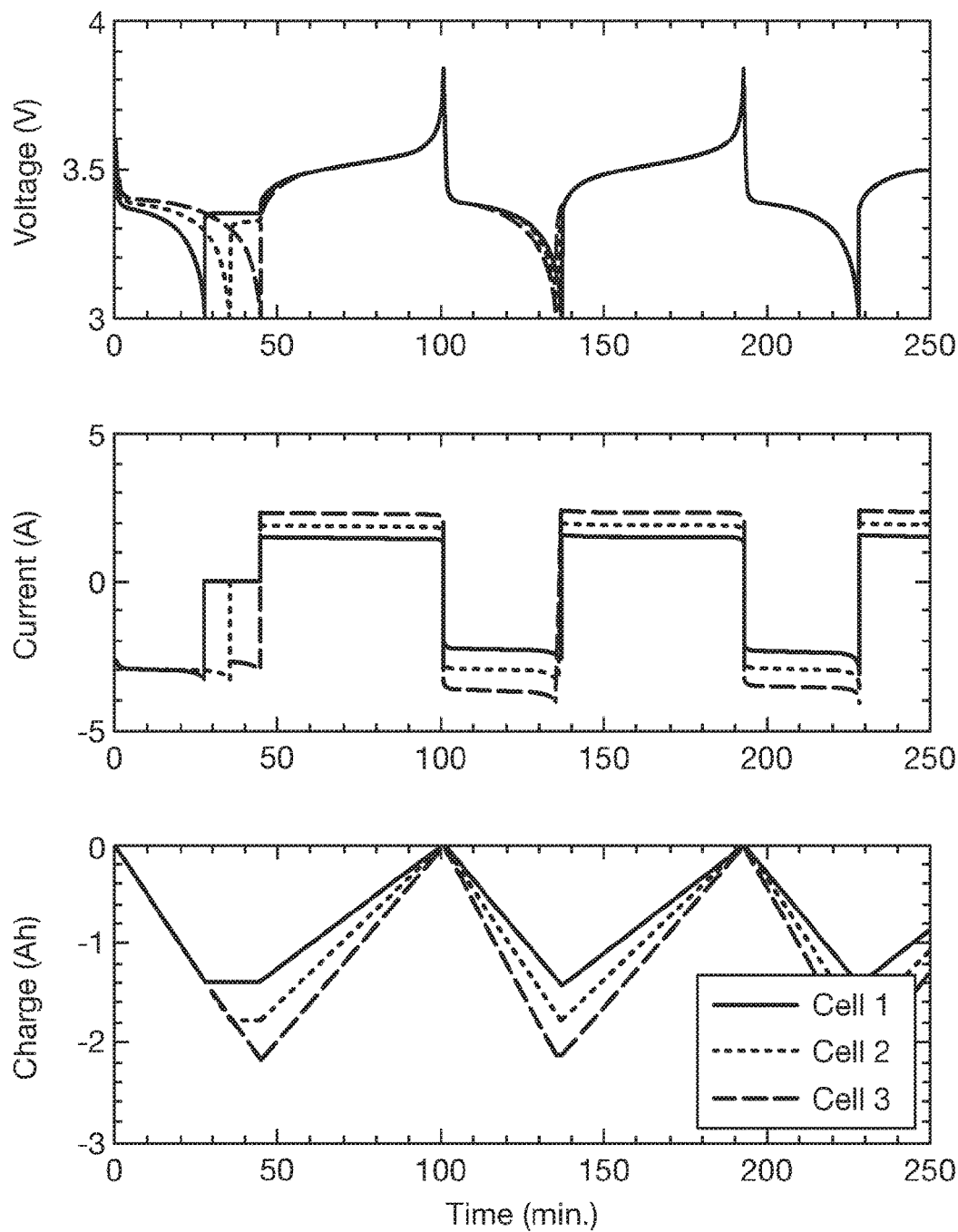
FIG. 5 shows the results of a simulation of multiple cell charging and discharging leading to cell synchronization.

The above described algorithm was implemented in MATLAB Simulink. FIG. 5 demonstrates how the algorithm synchronises discharge and charge cycles of three cells 20 with different capacities by adjusting the current load on each cell 20 in proportion to their capacities. It can be seen that the cycle times of the three cells 20 converge after the first two discharge-charge cycles. The cell capacities used for this simulation were 1600 mAh for Cell 1, 2000 mAh for Cell 2 and 2400 mAh for Cell 3. The standard Li-ion battery model of Simscape SimPowerSystems was used to emulate the battery voltage in response to a current load. For the first cycle of the simulation, a discharge power of 30 W and a charge power of 20 W were divided equally among the three cells. The cell capacities were estimated during each successive charge and discharge cycle to vary the parameter $K_b$. The simulation clearly demonstrates the feasibility of the BMS algorithm described above and illustrated in FIG. 4 for synchronizing cells of different capacities by active current control.

Figure 6:
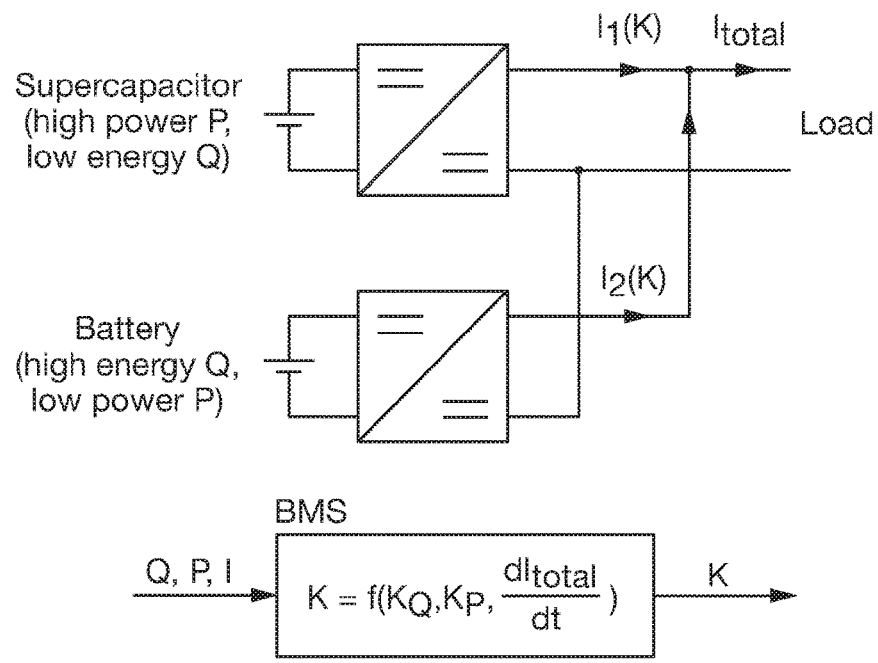
FIG. 6 illustrates a combination of batteries with supercapacitors.

The system is capable of combining battery and supercapacitor cells in order to combine the high energy capabilities of batteries with the high power capabilities of supercapacitors. FIG. 6 shows a possible hardware layout of such a combination. The DC to DC converters at each slot enable any arbitrary combination of battery cells and supercapacitors of different voltage and capacity characteristics. The currents drawn from supercapacitors and batteries are scaled with a factor K, which is a function of the energy capabilities $K_Q$ and the power capabilities $K_p$, of supercapacitors and battery cells, and of the rate of change of the load current. For example, if the system experiences a high power demand over a short time period (i.e. large values for $$\frac{dI_{total}}{dt}),$$

the current is primarily drawn from the supercapacitors, which are identified by high values for $K_p$, that are stored in the BMS for the corresponding cell slot. If the system experiences a low power demand over extended time periods (i.e. small values for $$\frac{dI_{total}}{dt}),$$

the current is drawn from the battery cells, which are identified by high values for $K_Q$. The values $K_Q$ and $K_p$ are updated as the battery and supercapacitor cells degrade over time, as described in the algorithm for cell management.

Figure 7:
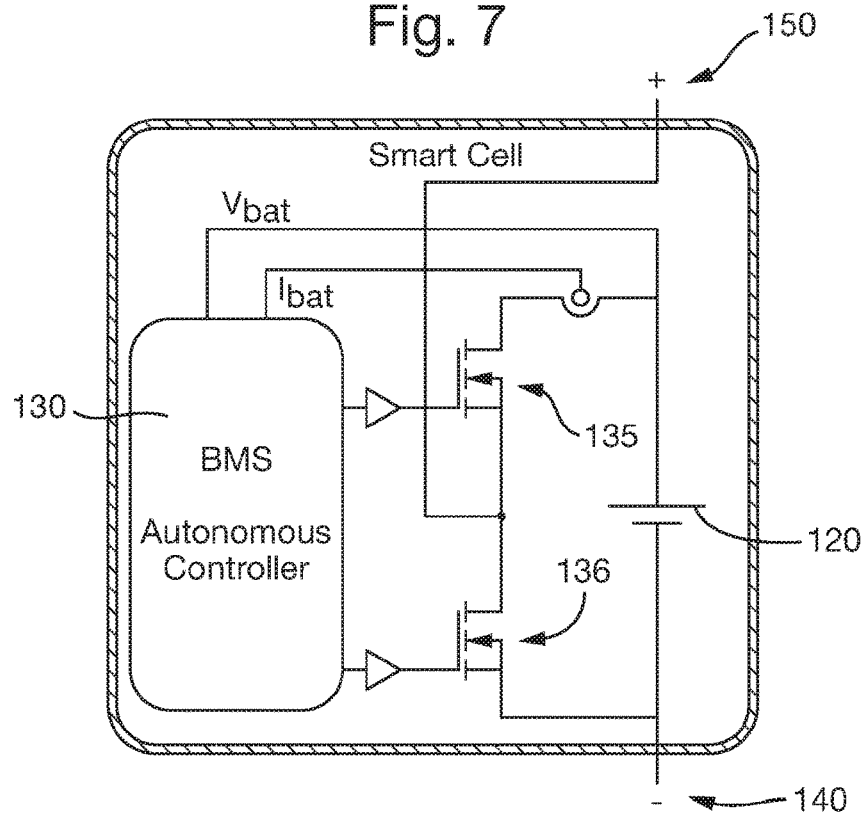
FIG. 7 shows a rechargeable battery cell suitable for a series configuration.

FIG. 7 shows a rechargeable cell 120 with a battery management system (BMS) 130 that is suitable for combining a number of cells in series while charging and discharging the cells at a rate according to their capacity in a similar manner as described above, implementing a modular multi-level control (MMC) circuit. The BMS 130 controls two switches 135, 136. When first switch 135 is on and second switch 136 is off, the cell 120 is connected into the circuit. When the first switch 135 is off and the second switch 136 is on, the cell 120 is disconnected from the circuit (bypassed). By carefully adjusting the switching rates so as to adjust the duty cycle for which the cell 120 is connected into the circuit, the cell's charge rate and discharge rate can be controlled. High switching rates and a filter may be used to smooth out the resultant voltage fluctuations. The circuit of FIG. 7 may be replicated, with the negative terminal 140 of one circuit connected to the positive terminal 150 of an adjacent circuit so as to connect multiple cells 120 in series.

The invention claimed is:
1. An electrical energy storage device comprising:
  a plurality of energy cell slots for receiving energy cells; and
  an individual controller for each energy cell slot of the plurality of energy cell slots;
  wherein each controller is arranged to estimate a characteristic of a cell in its respective energy cell slot; and wherein each controller is arranged to apply charge and discharge currents to its respective energy cell slot dependent upon at least one estimated characteristic currently associated with that slot.

2. The electrical energy storage device as claimed in claim 1, wherein the at least one characteristic comprises one or more of: a power capability, a storage capacity, a cell impedance, an energy cell type and an energy cell chemistry.

3. The electrical energy storage device as claimed in claim 2, wherein the at least one characteristic comprises a storage capacity, and
wherein the storage capacity estimate is based on a coulomb counting method.

4. The electrical energy storage device as claimed in claim 1, further comprising a bi-directional DC to DC converter for each cell slot, the DC to DC converters being controlled by the controller.

5. The electrical energy storage device as claimed in claim 1, wherein the controller is arranged to estimate the characteristic associated with each slot periodically.

6. The electrical energy storage device as claimed in claim 5, wherein the controller is arranged to estimate the characteristic associated with each slot after every charge phase.

7. The electrical energy storage device as claimed in claim 5, wherein the controller is arranged to estimate the characteristic associated with each slot after every discharge phase.

8. The electrical energy storage device as claimed in claim 1, wherein the controller is arranged to perform a full charge/discharge cycle upon startup.

9. The electrical energy storage device as claimed in claim 1, wherein a plurality of the slots each have an energy cell connected thereto.

10. The electrical energy storage device as claimed in claim 9, wherein the energy cells comprise rechargeable battery cells.

11. The electrical energy storage device as claimed in claim 10, wherein the energy cells comprise supercapacitors.

12. The electrical energy storage device as claimed in claim 9, wherein the plurality of cells comprises cells of different storage capacities.

13. The electrical energy storage device as claimed in claim 9, wherein the plurality of cells comprises cells of different cell chemistries.

14. The electrical energy storage device as claimed in claim 9, wherein the plurality of cells comprises cells of different power capabilities.

15. The electrical energy storage device as claimed in claim 1, wherein the controller is arranged to identify, based on the at least one estimated characteristic that a cell is no longer suitable for use in the electrical energy storage device.

16. An electrical energy storage device comprising:
a plurality of energy cell slots for receiving energy cells; and
a controller,
wherein the controller is arranged to estimate a characteristic of a cell in each slot, wherein the controller is arranged to apply charge and discharge currents to each cell slot dependent upon at least one estimated characteristic currently associated with that slot, and
wherein the controller implements a function which depends on the at least one characteristic estimate associated with each slot to determine the amount of charge/discharge current to sink/source to the slot.

17. The electrical energy storage device as claimed in claim 16, wherein the controller stores a history of characteristic estimates for each slot and wherein the function depends on the history.

18. The electrical energy storage device as claimed in claim 16, wherein the controller updates the function every time the at least one characteristic is estimated.

19. The electrical energy storage device as claimed in claim 16, wherein the at least one characteristic comprises capacity and wherein the function scales the charge/discharge current linearly with the estimated capacity.

20. A method of storing and using electrical energy in a plurality of energy cells comprising:
estimating by an individual controller of each energy cell at least one characteristic of the respective energy cell;
charging by the controllers the plurality of energy cells in a charging step that comprises:
simultaneously charging the plurality of cells by providing a charge current to each cell that is dependent upon at least one estimated characteristic of the cell; and
discharging the plurality of cells in a discharging step that comprises:
simultaneously discharging the plurality of cells by drawing a discharge current from each cell that is dependent upon at least one estimated characteristic of the cell.

21. The method as claimed in claim 20, wherein the at least one characteristic comprises one or more of: a power capability, a storage capacity, a cell impedance, an energy cell type and an energy cell chemistry.

22. The method as claimed in claim 21, wherein the at least one characteristic comprises a storage capacity, and
wherein the storage capacity estimate is based on a coulomb counting method.

23. The method as claimed in claim 21, wherein the charge current and the discharge current are provided through a bi-directional DC to DC converter for each cell slot, the DC to DC converters being controlled by a controller.

24. The method as claimed in claim 21, wherein the characteristic associated with each slot is estimated periodically.

25. The method as claimed in claim 24, wherein the characteristic associated with each slot is estimated after every charge phase.

26. The method as claimed in claim 24, wherein the characteristic associated with each slot is estimated after every discharge phase.

27. The method as claimed in claim 21, comprising performing a full charge/discharge cycle upon startup.

28. The method as claimed in claim 21, comprising implementing a function which depends on the at least one characteristic estimate associated with each slot to determine the amount of charge/discharge current to sink/source to the slot.

29. The A method as claimed in claim 28, comprising storing a history of characteristic estimates for each slot and wherein the function depends on the history.

30. The method as claimed in claim 28, comprising updating the function every time the at least one characteristic is estimated.

31. The method as claimed in claim 28, wherein the at least one characteristic comprises capacity and wherein the function scales the charge/discharge current linearly with the estimated capacity.

* * * * *